No. 760,637. PATENTED MAY 24, 1904.
S. D. MADDIN.
MOWING MACHINE.
APPLICATION FILED FEB. 14, 1902.
NO MODEL. 2 SHEETS—SHEET 1.
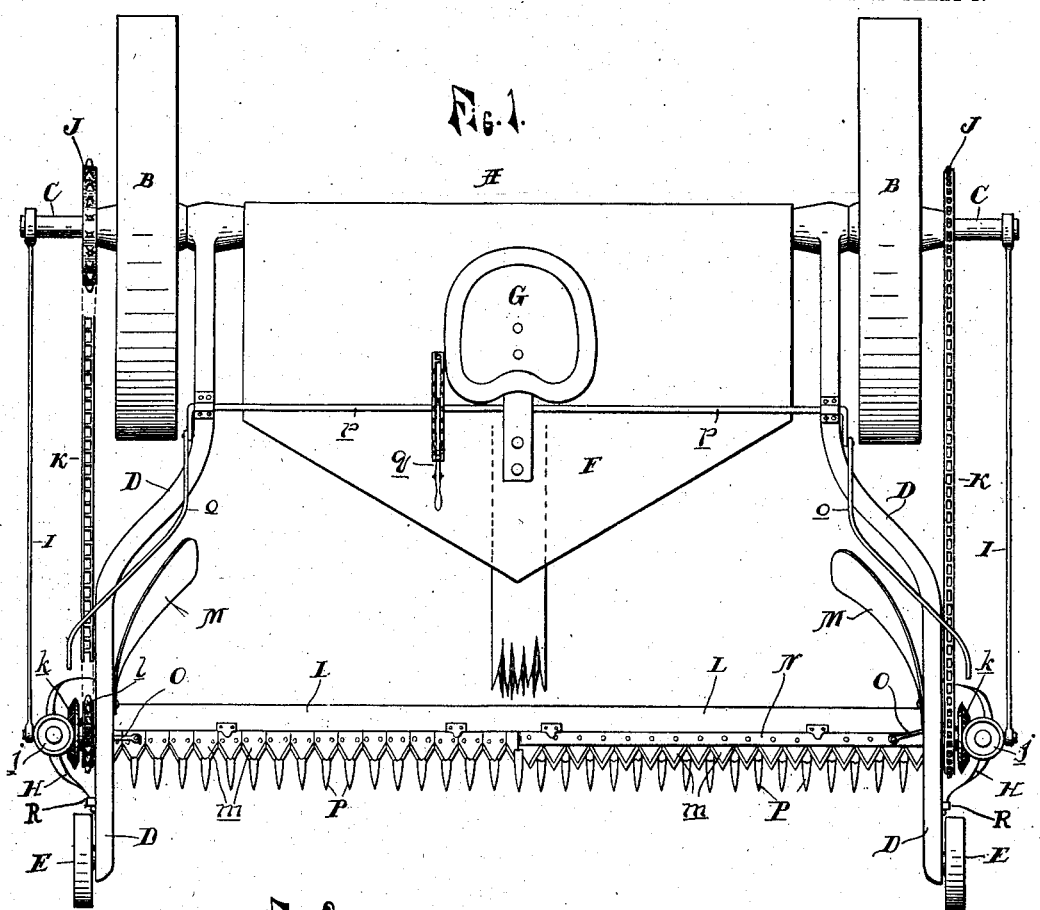
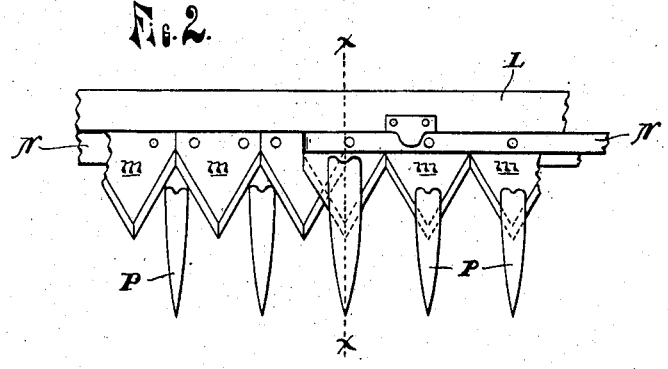
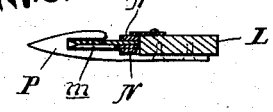
WITNESSES. INVENTOR.
Samuel D. Maddin
Attorneys.

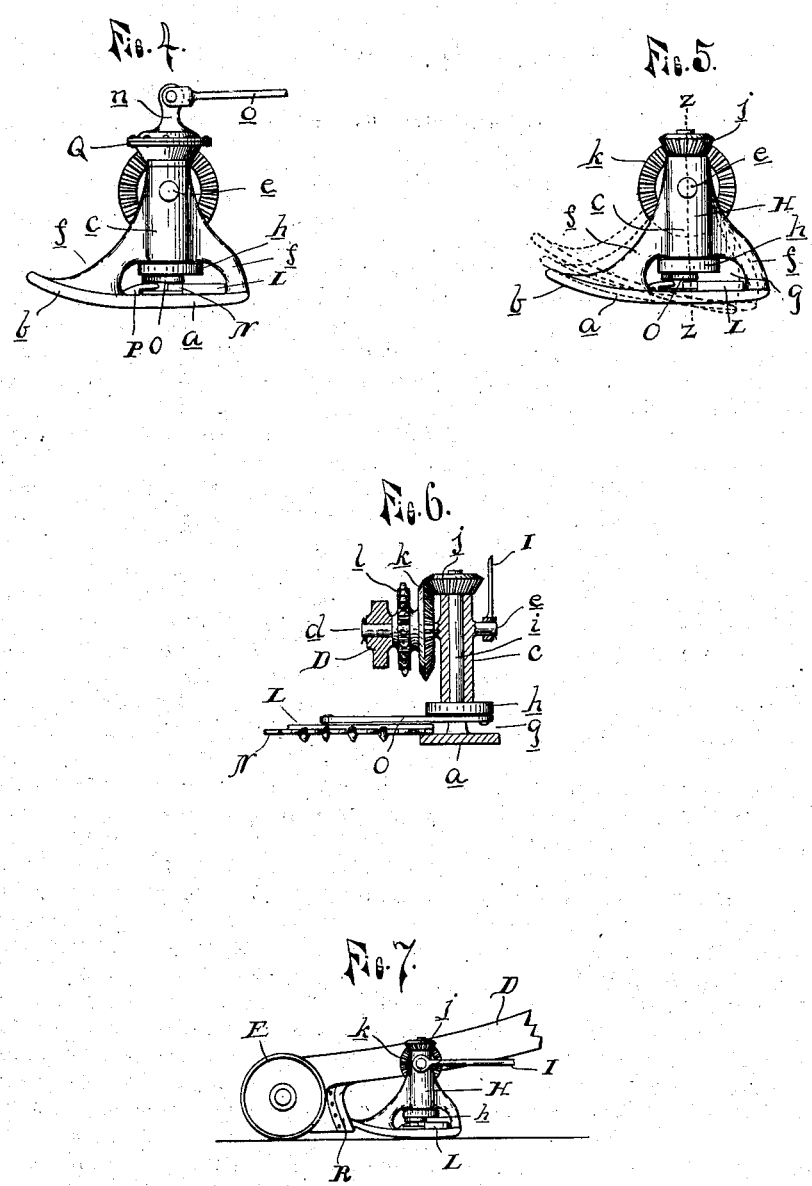

No. 760,637.

Patented May 24, 1904.

UNITED STATES PATENT OFFICE.

SAMUEL D. MADDIN, OF DETROIT, MICHIGAN, ASSIGNOR OF ONE-HALF TO MARCUS YOUNG, OF PORT HURON, MICHIGAN.

MOWING-MACHINE.

SPECIFICATION forming part of Letters Patent No. 760,637, dated May 24, 1904.

Application filed February 14, 1902. Serial No. 94,011. (No model.)

*To all whom it may concern:*

Be it known that I, SAMUEL D. MADDIN, a citizen of the United States of America, residing at Detroit, in the county of Wayne and State of Michigan, have invented certain new and useful Improvements in Mowing-Machines, of which the following is a specification, reference being had therein to the accompanying drawings.

This invention relates to new and useful improvements in mowing-machines, and has for its object to make a machine in which the height or angle of the cutting apparatus may be changed at will without effecting a disarrangement of the drive mechanism and whereby the load upon the machine will be reduced to a minimum by the use of a double knife-bar driven from the opposite sides of the machine, whereby all side thrust and vibration due to the use of a long knife-bar will be taken up.

To this end the invention consists in the employment of means more fully hereinafter described, whereby the cutting apparatus is pivotally mounted in the frame on opposite sides free to tilt at an angle thereto and whereby the knife-bar may be driven from the main supporting-wheels without disarrangement from the adjustment of the cutting apparatus.

The invention further consists in the use of a two-part knife-bar having its line of cut in approximately the same horizontal plane, but the two parts of which are arranged above and below said plane and are driven from the opposite sides of the machine by pitmen connected with the crank-disks, whereby the load upon the machine is lessened and all end thrust and vibration incidental to the use of a long knife-bar done away with, as the machine is equally balanced by reason of the two knife-bars working in opposite directions.

The invention consists, further, in the peculiar construction, arrangement, and combination of parts, all as more fully hereinafter described and claimed, and shown in the accompanying drawings, in which—

Figure 1 is a plan view of a mowing-machine containing the invention and in which the housing for the drive-gears is removed to better show the parts. Fig. 2 is an enlarged elevation of a portion of the knife and finger bars, showing the overlapping of the knife-bars. Fig. 3 is a section on line $x\,x$, Fig. 2. Fig. 4 is a side elevation of one of the pivoted shoes carrying the knife and finger bars and operating mechanism therefor. Fig. 5 is a similar view with the gear-casing removed, illustrating in dotted lines how the shoe can be tilted without affecting the adjustment of the drive mechanism. Fig. 6 is a section on line $z\,z$, Fig. 5. Fig. 7 is a side elevation of the front portion of a mower.

As shown in the drawings, A is a mower of well-known construction comprising the ground-wheels B B upon the axle C, the frame side bars D D, pivotally mounted on said axle and provided at their forward ends with the caster-wheels E E, the platform F, and driver's seat G, all of usual construction.

H represents the shoes pivotally mounted in the frame near its forward end on opposite sides for floating the knife and finger bars and drive mechanism therefor, said shoes being preferably cast in one piece comprising the base portion $a$, upwardly-curved front portion $b$, the vertical shaft-tube $c$, formed with trunnions $d\,e$ on opposite sides of the ribs $f$, uniting said tube with the base of the shoe, an open space $g$ being left at the base of the tube for the crank-disks $h$, and $i$ is a shaft fitting in said tube, to the lower end of which said crank-disk is secured and to the upper end of which is secured the bevel-pinion $j$, and $k$ is a bevel-gear sleeved on the trunnion $d$, meshing with the pinion $j$, a drive-sprocket $l$ being integrally formed with said gear. The shoes H are pivotally mounted on the outside of the frame-bars by the trunnions $d$, fitting in bearing-apertures formed near the outer end of the frame-bars, and I represents brace-rods connecting the trunnions $e$ with the axle, so that the shoes H are free to rock in their bearings.

J represents sprocket-wheels upon the axle, and K represents sprocket-chains connecting said sprockets with the sprockets $l$ to impart motion to the knife-bars.

L is a finger-bar extending across the front of the machine and secured at its opposite ends to the shoes H in the usual manner.

M M represent the gather-boards, which at their front ends are pivotally secured to the inside of the frame-bars in rear of the finger-bar and with their inner ends arranged to converge in the ordinary way, they acting to dispose of the cut grass or grain so as to clear the track for the machine-wheels.

N N are the knife-bars, to the adjacent faces of which are secured the knife-sections m m, said bars being of a length half that of the finger-bar, so that said knife bars and sections overlap for a slight distance at their inner ends, corresponding approximately to that of the length of the stroke, and O O are pitmen-rods connecting said knife-bars with the crank-disks, preferably at the quarter in relation to each other.

P represents the guard-fingers fast upon the finger-bar and coöperating with the knife-sections to cut the grain, all in the usual manner, the upper portion of one of said fingers at the middle of the bar extending slightly farther rearward than the others and having its lateral opening so arranged that the first half of the upper knife-section only cuts against the upper side of said opening and the lower knife-section cuts against the lower side, so that there will remain no uncut strip in the center, the first knife-section on the upper bar on one side only being sharpened on the reverse side to that of the other, as indicated by the dotted line in Fig. 2.

Q is a suitable casing or housing for the bevel gear-wheels and pinions on the shoes H, and n represents upward extensions or ears formed on said housings, to which are connected the rods o, and p is a transverse rock-shaft, to the free ends of which are connected the opposite ends of said rods, and q is a hand-lever fast on said shaft in proximity to the driver for actuating the same, so that the cutter-bar may be tilted at any desired angle or height from the ground without affecting the drive mechanism in any way as the pinion j rolls upon the gear k about its pivot, as shown in dotted lines in Fig. 5. Secured to the sides of the frame in front of the shoes H are the curved guide-plates R, in which said shoes are guided to prevent lateral movement and limit the vertical movement of the same.

Having thus fully described my invention, it will be seen that I obtain a machine which is simple, durable, and economical in operation, the knives being preferably so arranged that all side thrust and vibration due to the use of a long knife-bar is done away with by reason of using two light knife-bars working opposite to each other, besides which the knife or cutter bars can be tilted at any desired angle without affecting the drive mechanism.

One great advantage of my machine is that by reason of having the drive-gear, crank-shaft, and disk all carried by the shoe, which travels in contact with the ground, all vibration is taken up by the ground, as it cannot very well be transmitted to the driver through the sprocket-chain, and I have found in other machines that this excessive vibration has been the cause of sore necks of the horses by reason of the vibration being transmitted through the tongue to the horses, thus rendering them unfit for use after a short time.

What I claim as my invention is—

1. In a mowing-machine, the combination with the frame and shoes carried by the frame, of a finger-bar extending across the front of the frame and carried at its opposite ends by said shoes, knife-bars guided on said finger-bar with their inner ends overlapped, and separate means carried by the shoes for actuating each of said knife-bars from their respective sides.

2. In a mowing-machine, the combination with the frame, and drive mechanism, of a pair of shoes pivotally mounted in the frame, on opposite sides near its forward end, a finger-bar extending across the front of the machine and carried at its opposite ends by said shoes, knife-bars guided on said finger-bar with their inner ends overlapped and separate means actuated from the drive mechanism, carried by said shoes for actuating the knife-bars from their respective sides.

3. In a mowing-machine, the combination with the drive mechanism of a supporting-frame formed with transverse bearing-apertures near its forward end, shoes formed with trunnions fitting in said apertures on opposite sides of the frame and carrying the cutting and actuating mechanism, and means within easy reach of the operator for tilting said shoes in relation to the frame without causing a disarrangement of the drive mechanism.

4. In a mowing-machine, the combination with a frame formed with a bearing at its forward end, of a shoe formed with a vertical shaft-tube and a trunnion projecting therefrom adapted to fit in said bearing, a shaft sleeved in said tube and carrying a bevel-pinion and a crank-disk at its upper and lower ends respectively, a bevel-gear and sprocket sleeved on said trunnion intermediate said frame and shaft-tube, said gear meshing with said pinion, and means for driving said disk through the medium of said sprocket and intermediate gearing.

5. The combination with the frame the drive wheels and sprockets, of the finger-bar in front of the driving-wheels, the shoes at the ends of the finger-bar pivotally mounted in the frame on opposite sides, the vertical crank-shafts carried by said shoes, each of said shafts carrying a crank-disk and bevel-pinion at its opposite ends, bevel-gears meshing with said pinions and sprockets adjacent thereto, chains connecting said sprockets with the drive-sprockets, knife-bars guided on said finger-bar with their inner ends overlapped and pitmen connecting the outer ends of said bars with their respective crank-disks to impart motion thereto.

6. In a mowing-machine, the combination with the drive wheels and sprockets, of the finger-bar in front of the drive-wheels, the shoes at the ends of the finger-bar integrally formed with vertical shaft-tubes and trunnions pivotally mounted in bearings on the opposite sides of the frame, crank-shafts fitting in said tubes carrying crank-disks at their lower ends and bevel-pinions at their upper ends, bevel-gears and sprockets integrally formed therewith sleeved on said trunnions intermediate said frame and shaft-tubes, said gears and sprockets respectively meshing with said pinions and having chain connection with the drive-sprockets.

7. In a mowing-machine, the combination with the frame and drive-gear, of a finger-bar extending across the machine in front of the driving-wheels, knife-bars carried by the finger-bar, shoes at the opposite ends of the finger-bar pivotally mounted in the frame, and carrying the actuating mechanism for the knife-bars, said knife-bars having overlapping ends and a central finger formed with upper and lower faces against which the inner knives of the respective bars are adapted to cut.

8. In a mowing-machine, the combination with the frame and drive mechanism, of a pair of shoes pivotally mounted in the frame near its forward end on opposite sides and carrying the knife and finger bars, actuating mechanism for the knife-bars carried by said shoes and comprising crank-disks and pitmen connected to the opposite ends of said bars respectively, gears on the shafts of said disks connected with the drive mechanism, means for tilting said shoes without affecting the operation of the drive mechanism and guides secured to the frame in which said shoes are adapted to be guided.

9. In a mowing-machine, the combination with the frame, of a pair of shoes pivotally mounted on the frame near its forward end on opposite sides and carrying the finger-bar, knife-bars and actuating mechanism therefor, said knife-bars being driven from their opposite ends and overlapping with their adjacent ends, guides carried by the frame in which said shoes are guided and means in proximity to the operator for tilting said shoes.

10. In a mowing-machine, the combination with the shoe and knife-bar, of a vertical shaft-tube formed integral with the shoe, a shaft journaled therein carrying a bevel-pinion at its upper end, and a crank-disk at its lower end connected with the knife-bar, a trunnion formed on said tube forming the pivot for the shoe, and a bevel-gear and sprocket sleeved on said trunnion, said gear meshing with said pinion and adapted through the medium of said shaft and pinion to impart motion to said disk and knife-bar.

11. In a pivoted shoe for mowing-machines, the combination of a vertical tube integrally formed therewith, a shaft in said tube carrying a bevel-pinion at its upper end and a crank-disk at its lower end adapted to be connected with the cutting mechanism, a bevel-gear mounted in axial line with the pivot of the shoe and meshing with said pinion and a sprocket adjacent to said gear and adapted to impart motion thereto.

12. In a shoe for mowing-machines, the combination with the base, of a vertical shaft-tube carried by the base, a shaft in said tube carrying a pinion at its upper end and a crank-disk at its lower end adapted to be connected with the cutting apparatus, a trunnion-bearing projecting from the side of said tube forming the pivotal connection with the frame and means comprising a bevel-gear and sprocket sleeved on said trunnion-bearing for imparting motion to said pinion.

13. In a mowing-machine, the combination of a shoe integrally formed with a vertical shaft-tube having trunnions formed on opposite sides, a brace-rod extending into proximity to said trunnions, one of said trunnions fitting in a bearing in said rod and the other trunnion fitting in a bearing in the frame, a bevel-gear and sprocket integrally formed therewith sleeved on one of said trunnions, a shaft in said shaft-tube having a pinion meshing with said gear and a crank-disk at its lower end adapted to be connected with the cutting mechanism.

14. In a mowing-machine, the combination with the frame, of shoes pivotally mounted in the frame on opposite sides, a finger-bar extending across the front of the machine carried by said shoes, knife-bars overlapping with their adjacent ends and driven from their opposite ends, the upper knife-bar having the inner half of its inner knife-section ground on the opposite side to that of the other sections, a finger on said finger-bar in which said knife-sections overlap the overlapping sections cutting against the upper and lower faces of said finger respectively.

15. In a mowing-machine, the combination of two knife-bars having overlapping ends and actuating mechanism therefor, a finger-bar on which said knife-bars are adapted to travel, a finger formed with upper and lower faces against which the overlapped portions of the upper and lower knives are adapted to respectively cut, the inner half of the inner knife-section of the upper bar being ground at an angle opposite to that of the other sections.

In testimony whereof I affix my signature in presence of two witnesses.

SAMUEL D. MADDIN.

Witnesses:
OTTO F. BARTHEL,
LEWIS E. FLANDERS.